United States Patent

[11] 3,545,580

| [72] | Inventor | John S. Baer<br>Medford Lakes, New Jersey |
|---|---|---|
| [21] | Appl. No. | 781,761 |
| [22] | Filed | Dec. 6, 1968 |
| [45] | Patented | Dec. 8, 1970 |
| [73] | Assignee | Precision Specialties, Inc.<br>Pitman, New Jersey<br>a corporation of Missouri |

[54] STOP COLLAR ADJUSTMENT FOR CLUTCH
4 Claims, 6 Drawing Figs.

[52] U.S. Cl. ............................................. 192/26,
192/33, 192/110, 64/24
[51] Int. Cl. ....................................... F16d 11/06
[50] Field of Search ........................................... 192/12(B)-
—1, 22, 33(C), 26, 81, 110; 64/24

[56]         References Cited
            UNITED STATES PATENTS
1,295,686   2/1919   Brown ........................ 64/24UX 1,255,547   2/1918   Maynard ...................... 192/26
2,298,970   10/1942  Russell et al. ............... 192/33(C)UX
3,024,629   3/1962   Raskhodoff .................... 64/24

Primary Examiner—Benjamin W. Wyche
Attorney—Howson and Howson

ABSTRACT: This stop collar construction permits adjustment of a stop on the collar and consists of two relatively rotatable tubular members, one of which is fixed to the clutch structure and the other of which carries a stop. Worm drive means is provided by means of a helically threaded cylindrical screw rotatably supported in a fixed position relative to the other member tangent to a circumferential groove extending at least part way around the circumference of the outer face of the inner member and engaging the threads which form that groove. Preferably access to the screw at one end permits rotation of the screw by a suitable tool for relative rotational adjustment of the inner and outer collar members.

PATENTED DEC 8 1970
3,545,580
FIG. 1.
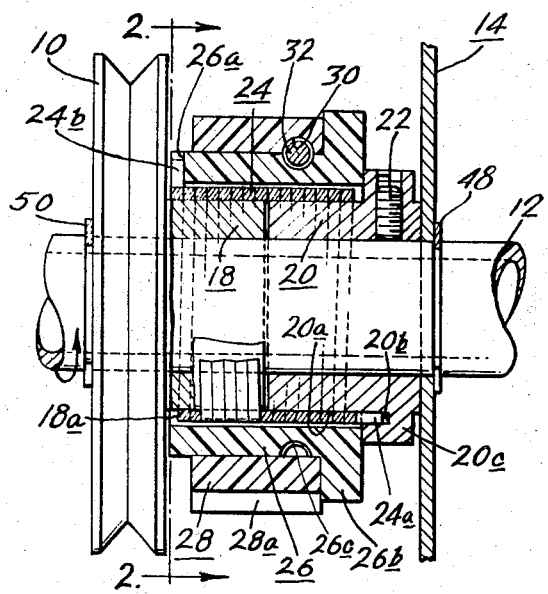
FIG. 2.
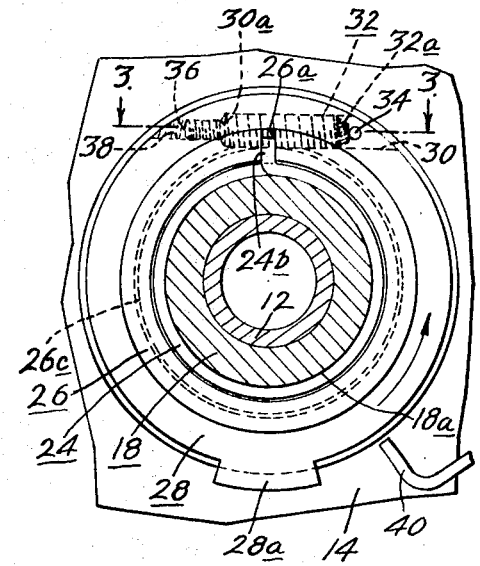
FIG. 4.
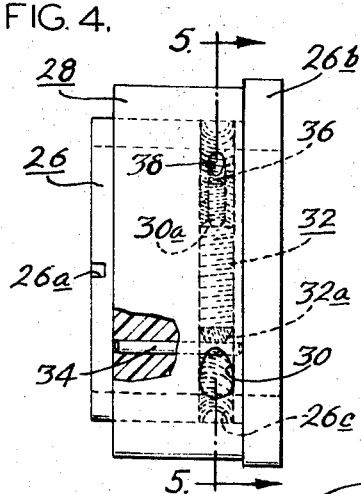
FIG. 5.
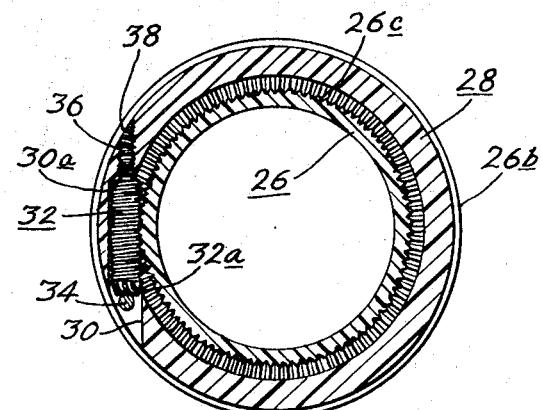
FIG. 6.
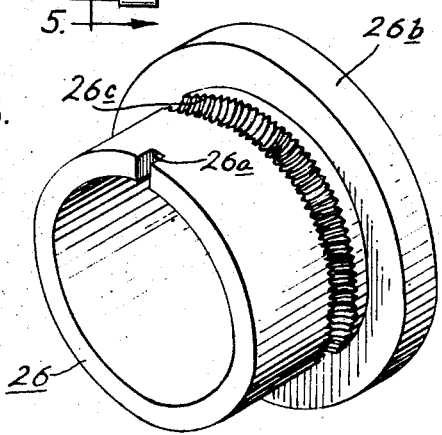
FIG. 3.
INVENTOR:
JOHN S. BAER
BY
Howson & Howson
ATTYS.

STOP COLLAR ADJUSTMENT FOR CLUTCH

The present invention relates to an adjustable stop collar for a clutch whereby a stop position may be adjusted relative to the point of connection of the collar to the clutch structure. More specifically, the present invention relates to a worm drive adjustment for a stop collar which permits relative rotational adjustment of the stop collar portions respectively bearing the stop collar and the clutch attachment means.

Many types of clutches, and particularly helically wound spring clutches, employ a rotatable collar on which at least one mechanical stop is provided. Ordinarily the stop is a radially extending shoulder or discontinuity on the outer periphery of the collar, into whose path a stop element is movable to intercept and stop the shoulder as required. The stop element is usually movably supported on a frame relative to which the clutch and collar rotate.

The stop on the stop collar as a matter of convenience is usually stopped at a particular point relative to the frame. In the prior art in spring clutches it has been desirable from a cost as well as an assembly point of view to provide the stop collar with a simple means of attachment to the clutch spring at a fixed point relative to the stop. As a particular matter then differences in overall length of the spring, even differences due to manufacturing tolerances have meant that the output hubs of different clutches will stop in different positions relative to the frame. Sometimes this is of no consequence. If it is of consequence the adjustment provided by the present invention allows correction to any desired point of stopping the output hub. In fact, without regard to differences from clutch to clutch or where a stop is fixed on the reference frame or the type of clutch employed, the present invention allows adjustment of the position in which the output hub will stop. Conversely if the output must stop in a given position the stop on the collar is adjustable to any desired position relative to the stop provided by the frame to accomplish stopping the output in that position. The present invention also permits simple adjustment of the stop position as the spring of a spring clutch wears, since without such adjustment the output will stop further and further from the original stopping position in the direction of drive.

More specifically, the present invention relates to an adjustable stop collar for a clutch wherein coaxial inner and outer tubular stop collar members are supported relative to one another to be relatively rotatable about their common axis. The inner member is adapted to be coupled to a clutch element and the outer member provides a stop. An outer surface of the inner member is provided with threads which constitute a circumferential groove extending at least part way around the circumference of an outer surface. The outer member is provided with screw means having helical threads mating with the threads on the inner member. The screw means is supported on the outer tubular member to rotate about its axis generally tangent to the outer surface of the inner tubular member while mating with the threads and is constrained against other movement.

For a better understanding of the present invention, reference is made to the accompanying drawings in which:

FIG. 1 is a side view partially in axial section showing a helical spring clutch employing a stop collar in accordance with the present invention;

FIG. 2 is a sectional view taken along line 2–2 of FIG. 1;

FIG. 3 is a sectional view taken along line 3–3 of FIG. 2;

FIG. 4 is a side elevation view of the stop collar structure alone with part of the structure broken away and part shown in phantom;

FIG. 5 is a sectional view along line 5–5 of FIG. 4 and

FIG. 6 is a perspective view of the inner member of the stop collar.

Referring to the drawings and particularly to FIG. 1, the clutch illustrated is a helical spring clutch of the single revolution type. It will be understood however by those skilled in the art that the present invention is not limited to this type of clutch, nor indeed to spring clutches.

Referring to FIG. 1, input is provided through a V-belt around the pulley sheave 10. Output is taken from the shaft 12. Shaft 12 is rotatably supported on a frame 14 which has an integral bearing 16 permitting relative rotation between the shaft and the frame. In the clutch shown the input pulley 10 is integral with tubular input hub 18. Pulley 10 and hub 18 are rotatably supported on shaft 12. The outer surface of tubular hub 18 is a cylindrical clutch surface 18a. Output hub 20 is of tubular form similar to the input hub but is fixed to the shaft 12 set screw 22 or other appropriate means to rotate with shaft 12. In the embodiment shown output hub 20 is immediately adjacent to input hub 18 and has an outer clutch surface 20a of the same diameter as clutch surface 18a. Normally engaged with the clutch surfaces 18a and 20a into which its resilience tends to cause it to wrap tightly, is helical clutch spring 24. Clutch spring 24 is attached at one end by an axially extending tang 24a to hub 20 by snug engagement in a retaining slot 20b in radially extending flange 20c. In the embodiment shown the set screw 22 holding the output hub 20 to shaft 12 extends through radially extending flange 20c. At the other end of clutch spring 24 is radially outwardly extending tang 24b, which is engaged in a radial slot 26a in inner control collar member 26. The control collar is composed of this tubular inner collar 26 and a tubular outer collar member 28 which carries a stop and which preferably fits snugly but rotatably over the outer surface of inner collar member 26 and against a circumferential radially extending flange 26b on collar 26.

The stop 28a in this instance is a protrusion having shoulders which are radial steps or discontinuities, first stepping up and then stepping down on the outer periphery of the outer stop collar 28. It will be understood that in other embodiments there may be more such stops than one.

As best seen in the perspective view of FIG. 6, inner collar member 26 is provided with a circumferential groove formed by screw threads extending at least part way, and preferably all the way, around the outer surface of the inner collar member. This same outer surface of the inner collar member is adjacent and in contact with the inner surface of the outer collar member 28. Through the outer collar member 28 is provided a bore 30 for retaining cylindrical screw 32 having helical threads. This bore is so oriented that the helical threads of screw 32 will engage the threads of groove 26c in inner collar member 26 when the screw extends generally tangentially of that groove. The screw 32 is free to rotate about its axis of rotation but is retained in position by a shoulder 30a provided by the bottom of the bore 30 at one end and by a pin 34 extending transversely across the bore 30 in position to engage the end of the screw 32 when its opposite end is against the shoulder 30a (see FIG. 3). The end of the screw 32a preferably has radial serrations which cooperate with the pin 34 and tend to hold the screw against rotation unless outside force is applied. The opposite end of the screw has an axial opening 32b of appropriate polygonal cross section to accept a hexagon wrench. The structure can obviously be modified for other tools for adjustment as desired. Once the desired position has been achieved, a further small setscrew 36 may be introduced against the adjusting end of the screw through tool access bore 38, which is of smaller diameter than bore 30. Ordinarily the worm gear construction of the device is sufficient to hold the inner and outer collar members in selected positions but auxiliary means as described are available as a further precaution against movement, if desired.

In this particular structure snap rings 48 and 50 together with the members fixed to the shaft through set screws 22, hold the structure in proper relative axial positions along the shaft.

The operation of the clutch illustrated may be considered beginning in the position shown in FIG. 2. When the stop 40, movably supported on frame 14 and already moved to its radially inward position shown, strikes the shoulder of stop 28a it will stop the collar and tang 24b of helical spring from further movement. Holding tang 24b will cause the helical spring to open; whereupon output hub 20 is no longer coupled to input hub 18 and rotation of pulley 10, therefore, no longer causes rotation of shaft 12.

Thereafter, when the stop 40 is radially withdrawn outwardly from the shoulder of stop 28a the collar 26—28 is free to move and spring 24 is again able to close down on hubs 18 and 20. Thereupon output hub 18 and shaft 12 will be driven through the clutch spring 24 by the input through input hub 18. Frequently in this type of structure only a single revolution is permitted and the stop 40 will be repositioned once the shoulder of stop 28 is past in order to stop the same stop shoulder on the next revolution. Alternatively by holding stop 40 away from the collar for a longer time multiple revolutions may be permitted or the device may be stopped upon demand by the repositioning of stop 40 as shown in the drawings.

The purpose of the present invention is to permit relative adjustment between the position of the stop member and the point of attachment of the clutch structure, here stop member 28a on collar member 28 and the retaining slot 26a on inner collar member 26 for spring tang 24b. Slot 26a represents but one type of attachment of the clutch element to the collar and other types can, of course, be employed within the scope of the invention. Sometimes, of course, it is convenient to make the same type of adjustment by loosening setscrew 22 and rotating the whole structure. On many occasions however, this is not advisable and has particular disadvantage if done by someone in the field who fails to set the setscrew 22 tight. It is also possible that a fine adjustment may be precluded by the presence of an indicator previously made by the setscrew adjacent the adjustment position and with which the tip of the setscrew tends to slide as it is tightened. Furthermore there are many other situations in which the means of attachment is either not adjustable at all or the adjustment means is not easily accessible. In every case the adjustment provided by the screw 32 and the threaded groove 26c is a positive worm drive which easily adjusts the relative rotational position and holds that position well even if the auxiliary retaining means are completely omitted.

The advantage of the present invention may be appreciated from the nature of the assembly process. First, the shaft 12 with hub 20 in place is inserted through the bearing 16 of frame 14 whereupon snap ring 48 is put in place. Finally the assembly of output hub spring 24 and collar 26—28 and input hub 18 and input pulley 10 are slid in place on shaft 12 and snap ring 50 added. Then final adjustment of the stop to desired position can be accomplished by inserting a hexagon wrench into the socket 32b in screw 32, and rotating it until the desired position of stop 28a relative to stop 40 is achieved. Setscrew 36 is then put in place. The adjustment in this case permits fine adjustment once setscrew 22 is in place. In other applications the means holding the output hub to the shaft may not be accessible, in which event an adjustment of this type provides even more advantage.

In accordance with the present invention it is desirable frequently to adjust the relative rotatable positions of the inner and outer collar members in order to change the position of the shoulder of stop 28a relative to the point of connection to the clutch member. This is simply done in accordance with the present invention by removing the setscrew 36 to provide access through bore 38 to the wrench socket 32b and the end of adjustment screw 32. Adjustment can then be made in either direction by rotating the screw 32 until a desired relative position between the stop and point of attachment to the screw is obtained.

In other embodiments the inner and outer collar members need not be in constant contact throughout their entire length including at the point where the screw member 32 contacts the threaded groove 26c. In most instances the two collar members will be tubular but a simple short ring might be substituted in one case or the other. The advantages of the present invention stem from its simplicity, its natural tendency as a worm gear to be self-locking and the relative ease of adjustment compared with other devices, particularly where access to the point of attachment of the clutch is not readily available.

I claim:

1. An adjustable stop collar for a clutch comprising tubular coaxial inner and outer members supported relative to one another to be relatively rotatable about their common axis, the inner member being adapted to be coupled to clutch structure and the outer member providing a stop, an outer surface of the inner member being provided with threads which constitute a circumferential groove extending at least part way around the circumference, the outer member being provided with screw means having helical threads mating with the threads on the inner member, said screw means extending along a chord of the outer cylindrical member in a bore through that member such that the bore retains the screw against lateral movement and being supported on the outer tubular member to rotate about its axis generally tangent the outer surface of the inner tubular member while mating with the threads and while being constrained against other movement and said screw member being retained by the end of the bore at one end and by a transverse member across the bore at its other end, and a smaller bore being provided coaxially with the larger bore from the end of the larger bore and providing access to the screw for adjustment thereof.

2. The adjustable stop collar of claim 1 in which the screw is provided with an axial socket for a wrench at that end of the screw accessible through the smaller bore.

3. The stop collar of claim 2 in which the smaller bore is threaded and retains a set screw to engage the end of the worm screw when not in use.

4. The stop collar of claim 3 in which cooperating serrations are provided on the end of the screw to engage the pin and minimize the tendency to turn.

UNITED STATES PATENT OFFICE
CERTIFICATE OF CORRECTION

Patent No. 3,545,580          Dated December 8, 1970

Inventor(s) John S. Baer

It is certified that error appears in the above-identified patent and that said Letters Patent are hereby corrected as shown below:

Column 2, line 55 - "appropriate polygonal" should be --hexagon--.

Claim 1, line 35, after "screw" insert --means--;

line 37, cancel "member" and substitute --means--

Claim 2, line 44, after "screw" insert --means--;

line 46, after "screw" insert --means--.

Claim 3, line 3, cancel "worm" and after "screw" insert --means--.

Claim 4, line 2, after "screw" insert --means--.

Signed and sealed this 14th day of September 1971.

(SEAL)
Attest:

EDWARD M. FLETCHER, JR.
Attesting Officer

ROBERT GOTTSCHALK
Acting Commissioner of Patent